(12) United States Patent
Hayut et al.

(10) Patent No.: US 8,924,605 B2
(45) Date of Patent: Dec. 30, 2014

(54) EFFICIENT DELIVERY OF COMPLETION NOTIFICATIONS

(71) Applicant: Mellanox Technologies Ltd., Yokneam (IL)

(72) Inventors: Ofer Hayut, Kvutzat Yavne (IL); Noam Bloch, Bat Shlomo (IL); Michael Kagan, Zichron Yaakov (IL); Ariel Shachar, Jerusalem (IL)

(73) Assignee: Mellanox Technologies Ltd., Yokneam (IL)

( * ) Notice: Subject to any disclaimer, the term of this patent is extended or adjusted under 35 U.S.C. 154(b) by 71 days.

(21) Appl. No.: 13/682,773

(22) Filed: Nov. 21, 2012

(65) Prior Publication Data

US 2014/0143455 A1    May 22, 2014

(51) Int. Cl.
- *G06F 3/00*    (2006.01)
- *G06F 13/00*    (2006.01)
- *G06F 3/01*    (2006.01)
- *H04L 12/00*    (2006.01)
- *H04L 12/46*    (2006.01)

(52) U.S. Cl.
CPC .............. *G06F 3/016* (2013.01); *G06F 13/00* (2013.01); *H04L 12/00* (2013.01); *H04L 12/4641* (2013.01)
USPC .............................................. 710/19; 710/35

(58) Field of Classification Search
None
See application file for complete search history.

(56) References Cited

U.S. PATENT DOCUMENTS

| | | | |
|---|---|---|---|
| 5,671,365 | A | 9/1997 | Binford et al. |
| 5,875,343 | A | 2/1999 | Binford et al. |
| 6,085,227 | A | 7/2000 | Edlund et al. |
| 6,718,370 | B1 | 4/2004 | Coffman et al. |
| 7,404,190 | B2 | 7/2008 | Krause et al. |
| 7,761,619 | B2 | 7/2010 | Feng et al. |
| 8,291,135 | B2 | 10/2012 | Subramanian et al. |
| 2008/0091868 | A1 | 4/2008 | Mizrachi et al. |
| 2008/0155154 | A1 | 6/2008 | Kenan et al. |
| 2011/0010557 | A1* | 1/2011 | Kagan et al. .................. 713/180 |
| 2013/0054858 | A1 | 2/2013 | Bugge |
| 2013/0124929 | A1* | 5/2013 | Harada et al. ................... 714/49 |
| 2013/0311488 | A1* | 11/2013 | Erdogan et al. ............... 707/752 |

OTHER PUBLICATIONS

U.S. Appl. No. 13/481,890, filed May 28, 2012.
U.S. Appl. No. 13/682,772, filed Nov. 21, 2012.
U.S. Appl. No. 13/682,772 Office Action dated Sep. 10, 2014.
Franke et al, "Introduction to the wire-speed processor and architecture", IBM Journal of Research and Development, vol. 54, No. 1, Paper 3, 11 pages, Jan.-Feb. 2010.
Patel et al, "A Model of Completion Queue Mechanisms using the Virtual Interface API", Proceedings of IEEE International Conference on Cluster Computing, pp. 280-288, Nov. 28-Dec. 1, 2000.
Pentakalos, O., "An Introduction to the InfiniBand Architecture", O'reilly Network, 8 pages, Apr. 2, 2002.

* cited by examiner

*Primary Examiner* — Kris Rhu
(74) *Attorney, Agent, or Firm* — D. Kligler I.P. Services Ltd.

(57) ABSTRACT

A computer peripheral device includes a host interface, which is configured to communicate over a bus with a host processor and with a system memory of the host processor. Processing circuitry in the peripheral device is configured to receive and execute work items submitted to the peripheral device by client processes running on the host processor, and responsively to completing execution of the work items, to generate completion reports and to write a plurality of the completion reports to the system memory via the bus together in a single bus transaction.

20 Claims, 4 Drawing Sheets

EFFICIENT DELIVERY OF COMPLETION NOTIFICATIONS

FIELD OF THE INVENTION

The present invention relates generally to computer systems, and particularly to input/output (I/O) devices and their interaction with host computing devices.

BACKGROUND

Switched-fabric communication architectures are widely used in high-performance computing. Examples of such architectures include InfiniBand™ and high-speed Ethernet™. Aspects of these architectures will be described here by way of illustration (and implementation of an embodiment of the present invention in the Ethernet environment will be described below in the Detailed Description), but it should in no way be understood that the present invention is limited to one particular type of switched fabric or another.

Computing devices (host processors and peripherals) connect to the switched fabric via a network interface controller (NIC), which is referred to in InfiniBand (IB) parlance as a channel adapter. Host processors (or hosts) use a host channel adapter (HCA), while peripheral devices use a target channel adapter (TCA). Client processes (referred to hereinafter as clients), such as software application processes, running on a host processor communicate with the transport layer of the fabric by manipulating a transport service instance, known as a "queue pair" (QP), which is made up of a send work queue and a receive work queue. To send and receive messages over the network using a HCA, the client submits work items, called work queue elements (WQEs), for execution by the HCA. (More precisely, the client initiates work requests (WRs), which cause WQEs to be placed in the appropriate work queues.) After it has finished servicing a WQE, the HCA typically writes a completion report, in the form of a completion queue element (CQE), to a completion queue, to be read by the client as an indication that the work request has been executed.

Although the above terminology and some of the embodiments in the description that follows are based on features of the IB architecture and use vocabulary taken from IB specifications, similar mechanisms exist in networks and I/O devices that operate in accordance with other protocols, such as Ethernet and Fibre Channel. The IB terminology and features are used herein by way of example, for the sake of convenience and clarity, and not by way of limitation.

SUMMARY

Embodiments of the present invention provide efficient schemes for reporting completion of tasks performed by peripheral devices.

There is therefore provided, in accordance with an embodiment of the present invention, a computer peripheral device, including a host interface, which is configured to communicate over a bus with a host processor and with a system memory of the host processor. Processing circuitry is configured to receive and execute work items submitted to the peripheral device by client processes running on the host processor, and responsively to completing execution of the work items, to write completion reports to the system memory, including first completion reports of a first data size and second completion reports of a second data size, which is smaller than the first data size.

In a disclosed embodiment, the processing circuitry is configured, after generating a first completion report of the first data size, to generate further completion reports, to compare the further completion reports to the first completion report, and to generate the second completion reports of the second data size by eliminating one or more data fields from the further completion reports that have values identical to corresponding data fields in the first completion report.

In another embodiment, the processing circuitry is configured to write the first completion reports, containing a first set of data fields, to a first completion queue in the system memory, and to write the second completion reports, containing a second set of the data fields, smaller than the first set, to a second completion queue in the system memory. The second set of the data fields may be created by eliminating one or more of the data fields from the first set, such that each of the one or more of the eliminated data fields has a respective common value with respect to all of the second completion reports in the second completion queue.

In some embodiments, the processing circuitry may be configured to write a plurality of the second completion reports to the system memory via the bus together in a single bus transaction. Alternatively or additionally, at least one of the completion reports includes a merged completion report, which is generated by the processing circuitry to report completion of multiple, successive work items submitted by one of the client processes.

In a disclosed embodiment, the device includes a network interface, which is configured to transmit and receive data packets to and from a network, and each completion report indicates that one or more data packets have been transmitted or received in accordance with a corresponding work item.

There is also provided, in accordance with an embodiment of the present invention, a computer peripheral device, including a host interface, which is configured to communicate over a bus with a host processor and with a system memory of the host processor. Processing circuitry is configured to receive and execute work items submitted to the peripheral device by client processes running on the host processor, and responsively to completing execution of the work items, to generate completion reports and to write a plurality of the completion reports to the system memory via the bus together in a single bus transaction.

Each of the completion reports in the plurality may have a data size that is less than a minimum transaction size of the bus.

In some embodiments, the device includes a cache, wherein the processing circuitry is configured to write the completion reports to respective completion queues in the system memory, to associate each line of the cache with a respective completion queue, to save the completion reports in the lines of the cache, and then to write the plurality of the completion reports from each of at least some of the lines in the cache to the respective completion queue in the system memory. The processing circuitry may be configured, upon generating a completion report for a given completion queue for which there is no associated line in the cache, to write the generated completion report immediately to the system memory and to associate one of the lines of the cache with the given completion queue.

In a disclosed embodiment, the processing circuitry is configured to detect congestion on the bus, and to write the plurality of the completion reports via the bus together responsively to detecting the congestion, and to write the completion reports via the bus to the system memory individually when the bus is not congested.

There is additionally provided, in accordance with an embodiment of the present invention, a computer peripheral device, including a host interface, which is configured to communicate over a bus with a host processor and with a system memory of the host processor. Processing circuitry is configured to receive and execute work items submitted to the peripheral device by client processes running on the host processor, and responsively to completing execution of the work items, to write completion reports to the system memory, including at least one merged completion report that reports completion of multiple work items in a succession of the work items submitted by one of the client processes.

Typically, each completion report includes multiple data fields having respective values, and the processing circuitry may be configured to write the completion reports to respective completion queues in the system memory, to compare the respective values of the data fields in at least first and second completion reports that are directed to a given completion queue, and to merge the first and second completion reports into a merged completion report upon finding that the respective values of a predefined set of the data fields in the first and second completion reports are identical.

Additionally or alternatively, the processing circuitry may be configured to insert in the merged completion report a value of a repeat counter, indicating a number of the multiple work items whose completion is reported by the merged completion report.

In a disclosed embodiment, the processing circuitry is configured to detect congestion on the bus and to merge the completion reports responsively to detecting the congestion, and to write the completion reports via the bus to the system memory individually, without merging the completion reports, when the bus is not congested.

There is further provided, in accordance with an embodiment of the present invention, a method for reporting, which includes receiving and executing, in a peripheral device, work items submitted to the peripheral device by client processes running on a host processor having a system memory. Responsively to completing execution of the work items, completion reports are written from the peripheral device to the system memory, including first completion reports of a first data size and second completion reports of a second data size, which is smaller than the first data size.

There is moreover provided, in accordance with an embodiment of the present invention, a method for reporting, which includes receiving and executing, in a peripheral device, work items submitted to the peripheral device by client processes running on a host processor having a system memory and a bus connecting the peripheral device to the system memory. Completion reports are generated in the peripheral device responsively to completing execution of the work items, and a plurality of the completion reports are written to the system memory via the bus together in a single bus transaction.

There is furthermore provided, in accordance with an embodiment of the present invention, a method for reporting, which includes receiving and executing, in a peripheral device, work items submitted to the peripheral device by client processes running on a host processor having a system memory. Responsively to completing execution of the work items, completion reports are written from the peripheral device to the system memory, including at least one merged completion report that reports completion of multiple work items in a succession of the work items submitted by one of the client processes. The present invention will be more fully understood from the following detailed description of the embodiments thereof, taken together with the drawings in which:

Figure 1:
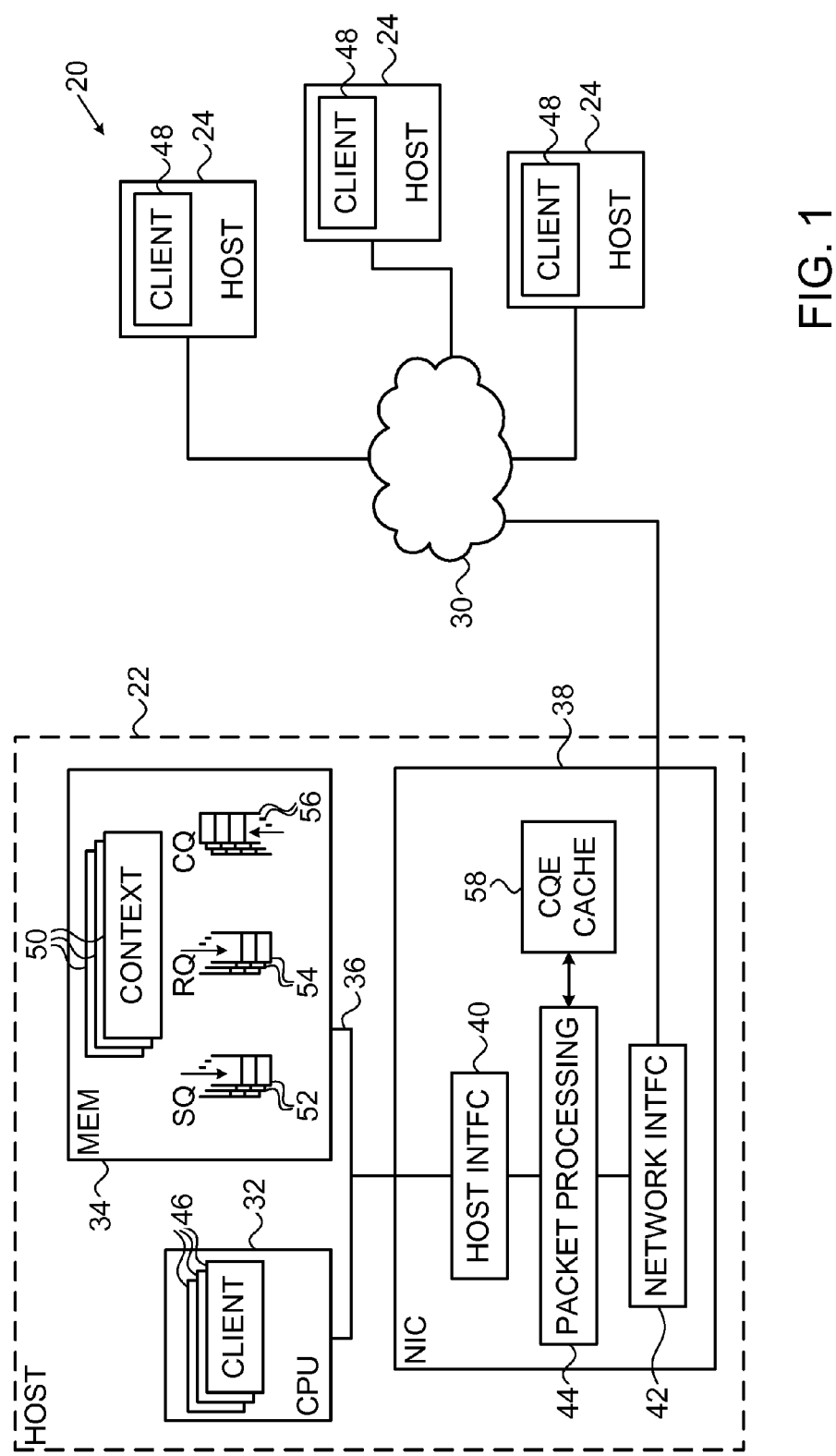
FIG. 1 is a block diagram that schematically illustrates a computer system, in accordance with an embodiment of the present invention.

DETAILED DESCRIPTION OF EMBODIMENTS
OVERVIEW

Transmission of completion reports from a peripheral device to host memory can consume considerable bandwidth on the host bus and data volume in the memory. For example, in systems known in the art, in which completion reports are transmitted over a peripheral component bus, delivery of each report requires execution of a bus transaction, even if the amount of data in each such report is small. Taking a NIC as an example of a peripheral device, and CQEs as examples of completion reports, when the NIC exchanges large amounts of data with many different nodes in a network, each such exchange may entail delivery of a CQE to the host memory. In systems that are known in the art, the large number of CQEs to be delivered results in an equally large number of bus transactions, which can cause a bottleneck in system performance.

Embodiments of the present invention that are described hereinbelow address these problems by eliminating non-essential information from at least some of the completion reports that are transmitted by a peripheral device. In particular, when a sequence of completion reports is transmitted to a given completion queue, repeated information, which is common to all of the reports in the sequence, may be eliminated, thereby reducing the data volume per report. When appropriate, multiple completion reports of reduced size may be transmitted at once, in a single bus transaction, in order to reduce the number of bus transactions that are entailed.

In the disclosed embodiments, a peripheral device comprises a host interface, which communicates over a bus with a host processor and with a system memory of the host processor. Processing circuitry in the peripheral device receives and executes work items, which are submitted to the peripheral device by client processes running on the host processor, and then writes completion reports to the system memory. The completion reports may be of different sizes: When necessary, the peripheral device sends a full complement of all completion information that will be required by the client process to identify the work item that was completed. When possible, however, the peripheral device may send completion reports of a smaller data size, from which superfluous information has been eliminated. Typically, these smaller completion reports rely on the client process to draw any needed additional information from a previous completion report in the same completion queue or from other sources, such as application memory or the context of the completion queue itself.

Additionally or alternatively, in order to reduce the number of bus transactions (and thus reduce bus transmission overhead and conserve bus bandwidth), the peripheral device may in some cases delay the transmission of completion reports that it has generated, and then may write multiple completion reports to the system memory together in a single bus transaction. This sort of collection of completion reports in a single transaction is useful particularly (although not exclusively) when the data size of each completion report is smaller than the minimum transaction size of the bus. Such a situation may arise, for example, when the data sizes of the completion reports are reduced as described above.

Further additionally or alternatively, the peripheral device may transmit a single completion report to report completion of a succession of work items submitted by a given client process. This approach is useful, for example, when the successive completion reports that would otherwise be sent to report completion of the successive work items would share the same substantive information, with the exception of a counter and/or timestamp. In this case, a single completion report with the counter value of the last completion report, corresponding to the last work item in the succession, can be sent and will be interpreted by the client process as an indication that all of the work items up to and including the last one have been completed.

Although the embodiments described hereinbelow relate, for the sake of convenience and clarity, to transmission of CQEs from a NIC to a host memory, the principles of the present invention same similarly be applied to substantially any type of completion reports. Such reports may be generated and conveyed to the host processor by substantially any type of I/O device, such as a storage controller, as well as by other sorts of peripheral devices, such as a graphics processing unit (GPU), that may be required to report to a host processor on completion of assigned tasks. In this context, the term "peripheral device" may refer to any sort of execution unit other than the processing core or cores of the central processing unit (CPU) itself.

System Description

FIG. 1 is a block diagram that schematically illustrates a network communication system 20, in accordance with an embodiment of the present invention. A host computer 22 (also referred to as a host or a host device) communicates with other hosts 24 via a network 30, such as an IB or Ethernet switch fabric in the present example. Computer 22 comprises a central processing unit (CPU) 32 and a system memory 34 (also referred to as a host memory), which are connected by a suitable bus 36. A NIC 38, such as an HCA, connects computer 22 to network 30. NIC 38 is connected to the other components of computer 22 by bus 36, which may be a peripheral connection bus, such as a PCI Express™ (PCIe) bus, or it may be an internal system bus of CPU 32, depending on the architecture of the computer.

NIC 38 comprises a network interface 42, which is coupled to network 30, and a host interface 40, which connects to CPU 32 and memory 34 via bus 36. Packet processing circuitry 44, coupled between network interface 42 and host interface 40, generates outgoing packets for transmission over network 30 and processes incoming packets received from the network. Interfaces 40 and 42 and circuitry 44 typically comprise dedicated hardware logic, whose details will be apparent to those skilled in the art after reading the present description. Alternatively or additionally, at least some of the functions of circuitry 44 may be implemented in software on a suitable programmable processor.

Client processes (referred to simply as clients 46) running on CPU 32, such as processes generated by application software, communicate with clients 48 running on remote hosts 24 by means of QPs on NIC 38. Each client 46 may be assigned multiple QPs, for communication with different clients on various remote hosts. Context information regarding each QP is stored in a corresponding context 50. In the present embodiment, context 50 is stored in host memory 34; but context information may, additionally or alternatively, be stored in NIC 38 or in other dedicated memory. Each QP typically comprises a send queue (SQ) 52 and a receive queue (RQ) 54, as is known in the art. As noted earlier, clients 46 submit work items, in the form of WQEs, for execution by NIC 38 by initiating work requests, which cause the WQEs to be written to the appropriate SQ 52 or RQ 54 by host software.

NIC 38 reads and executes the WQEs from SQ 52 and RQ 54, and accordingly transmits data from specified locations in memory 34 in outgoing packets over network 30, and writes data from incoming packets to the memory. Upon completion of a WQE, circuitry 44 typically writes a CQE to a completion queue (CQ) 56. Each CQ has its own context 50, which may be stored, like the QP context, in memory 34. Typically, each QP is assigned a corresponding CQ, and the CQ number for each QP is recorded in QP context 50. (Multiple QPs may share the same CQ.) In embodiments of the present invention, however, circuitry 44 may not write every CQE to memory as soon as it is generated, but rather may collect at least some of the CQEs in a CQE cache 58 in NIC 38, and may then transmit the collected completion information together over bus 36 in a single bus transaction, as described further hereinbelow.

After writing a CQE to CQ 56, circuitry 44 may assert an interrupt to cause CPU 32 to read and process the CQE. Alternatively or additionally, the CPU may periodically poll CQs 56 for new CQEs. These aspects of CQE handling are described, for example, in U.S. patent application Ser. No. 13/481,890, whose disclosure is incorporated herein by reference, but they are beyond the scope of the present disclosure.

To report all relevant completion information to client 46, a CQE may typically comprise as much as 64 or 128 bytes of information. (To avoid inefficient access to memory 34, it is also desirable that the transmitted data size be no smaller than the length of a single cache line of CPU 32, which is typically 64 or 128 bytes in current-generation devices.) For example, the following table lists data fields that may be used in CQEs that report transmission or reception of packets over an Ethernet network:

TABLE I

FULL ETHERNET CQE LISTING

| Field name | Description |
| --- | --- |
| UP | Ethernet user-priority (802.1p) taken from the VLAN header |
| CFI | Ethernet CFI bit, taken from the VLAN header |
| VLAN-ID | Ethernet VLAN-ID |
| IPv6/IPv4 Encap | Indicates L3 de-capsulation type |
| IPv6 Extension Mask/ IPv4 Options/ IPv4 Frags | Indicates packet fragmentation |
| TCP/UDP/ETACK | Indicates L4 header type |
| HDS TYPE | Indicates Header-Data split |
| L4 CSUM | TCP/UDP packet with IPOK set and correct L4 checksum |
| IPOK | IP headers are identified and L3 checksum is correct |
| VLAN | Indicates VLAN header type |

TABLE I-continued

FULL ETHERNET CQE LISTING

| Field name | Description |
| --- | --- |
| Checksum | Computed over packet - 16 bits |
| FL | Packet received due to force loopback |
| L3 Header | indicates L3 header was written to memory |
| L3 Header Type | Indicates L3 header type |
| RSS Hash Result | 32 bit RSS/RCA hash function result |
| RSS Hash Type | Indicates whether RSS/RCA found a match according to one of the flags (non-zero) or did not find a match (zero). |
| SRQN | For shared receive queue (SRQ) responder - SRQ Number |
| LRO fields | Information relating to large receive offload packets |
| Byte Count | Byte count of data transferred (32 bits) |
| Time stamp | 64-bit sample of the internal timer taken when CQE is generated. |
| QPN | QP number that generated this CQE |
| Wqe Counter | wqe_counter of the WQE completed. |
| Owner | CQE ownership bit - flipped every time CQ number wraps around. |

The above list is presented by way of example of the types of data provided by a NIC with strong Ethernet protocol-offload capabilities. Certain of the fields in the table may be omitted, and other fields may be added, depending on the network type (such as Ethernet or InfiniBand) and capabilities of the NIC.

CQEs with Reduced Data Size

FIGS. 2A-2D are block diagrams that schematically illustrate schemes for reduction of the data size of CQEs generated by NIC 38, in accordance with a number of embodiments of the present invention. Some of these embodiments are also useful in reducing the number of transactions required on bus 36 to convey these CQEs to memory 34.

Figure 2D:
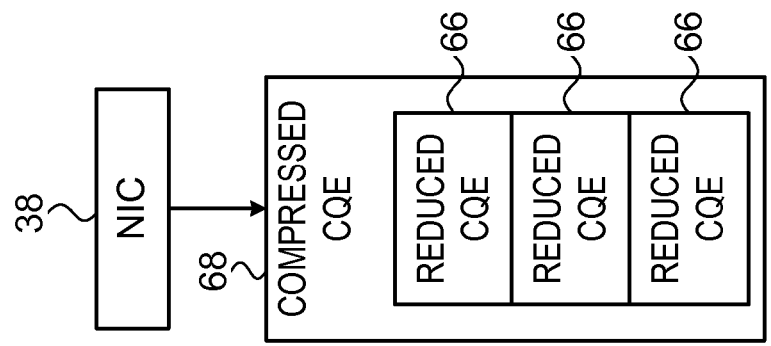
FIGS. 2A-2D are block diagrams that schematically illustrate the generation of sequences of CQEs, in accordance with an embodiment of the present invention.
Figure 2C:
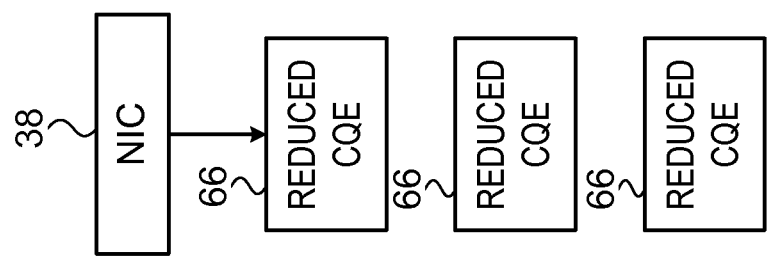
Figure 2B:
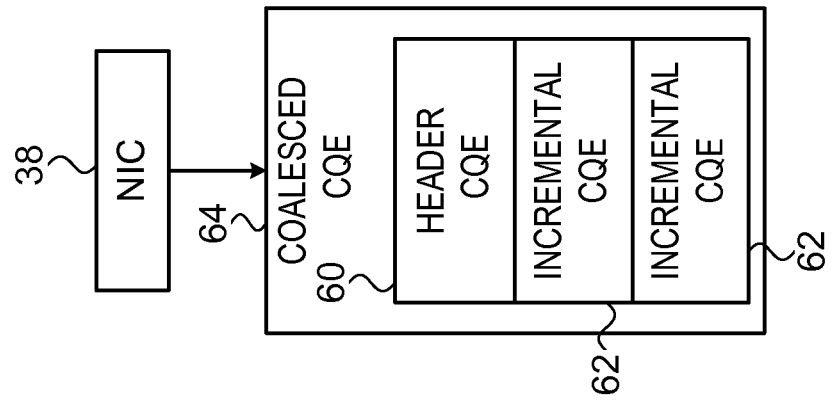
Figure 2A:
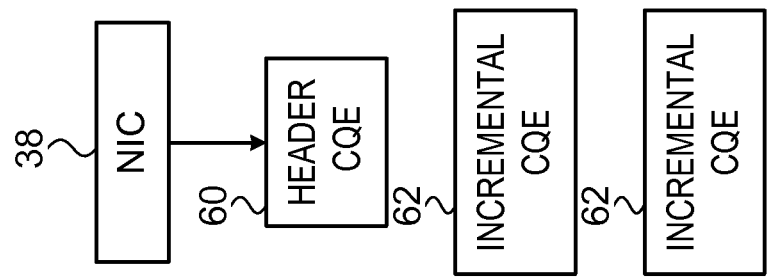

In the scheme of FIG. 2A, an initial CQE (referred to as a header CQE 60) in a succession of CQEs directed by NIC 38 to a given CQ 56 contains the full complement of completion information, such as the information presented above in Table I. In subsequent CQEs, however, much of the completion information may simply duplicate that in header CQE 60. Therefore, rather than sending these subsequent CQEs at full size, NIC 56 transmits incremental CQEs 62, containing the fields of completion information that have changed since the previous CQE in the succession. Repeated information, such as packet header fields and QPN, is omitted from the incremental CQEs.

Thus, for example, assuming all packets transmitted or received on a given QP have the same source and destination information (referred to in Ethernet parlance as a "five-tuple"), incremental CQEs 62 need contain only the ETACK information and byte count fields, as listed in the table above. In this case, the size of the incremental CQEs may be reduced to less than eight bytes. Alternatively, when five-tuple information varies within the same QP or CQ, the size of the incremental CQEs may be greater.

As client 46 reads incremental CQEs 62, it reconstructs the complete CQE information as needed on the basis of information extracted previously from header CQE 60 and stored by client 46. When NIC sends a new header CQE (for example, to report completion of a new succession of WQEs, with different contents), the stored information is reset and refreshed.

CQEs 60 and 62 may be stored briefly in CQE cache 58 and then concatenated into a single "coalesced CQE" 64 for transmission over bus 36, as illustrated in FIG. 2B. For efficient use of bus and memory resources, it is desirable that the size of coalesced CQE 64 be an integer multiple of the cache line size (for example 64 or 128 bytes). The more CQEs 62 that can be coalesced in this manner, the greater will be the savings in terms of bus bandwidth, though at the cost of greater latency in CQE delivery to clients 46.

FIG. 2C schematically illustrates a scheme in which NIC 38 generates reduced CQEs 66, i.e., CQEs from which certain data fields have been removed, relative to the full CQE format (such as that listed above in Table I), in order to reduce the data size of the CQE. Typically, the fields that are removed from CQEs 66 are those that are common to multiple, successive CQEs and that client can derive from other sources. The present scheme differs from that of FIG. 2A in that all reduced CQEs 66 are typically of the same size and contain the same data fields. The client 46 that is to open and interpret CQEs 66 may draw the remaining information from context 50 in memory 34 or possibly from application memory or other sources at the disposal of the client.

Typically, only certain CQs 56 are configured in context 50 to receive reduced CQEs 66, while other CQs receive, by default, the larger full-format CQE. Only certain QP numbers are mapped to these reduced-CQE CQs, and it is the job of the programmer to ensure that clients 46 are allocated QPs (and hence CQs) of the desired type and are able to interpret the CQEs that they receive.

Sequences of reduced CQEs 66 may be concatenated into compressed CQEs 68, as illustrated in FIG. 2D. The motivation for and operation of this scheme are similar to those of the scheme based on coalesced CQEs 64 that is shown in FIG. 2B (with the only substantive difference between the schemes being the formulation of the CQEs in the combined or coalesced form). A method by which NIC 38 may manage coalescing or compression of CQEs is described below with reference to FIG. 4.

Figure 3:
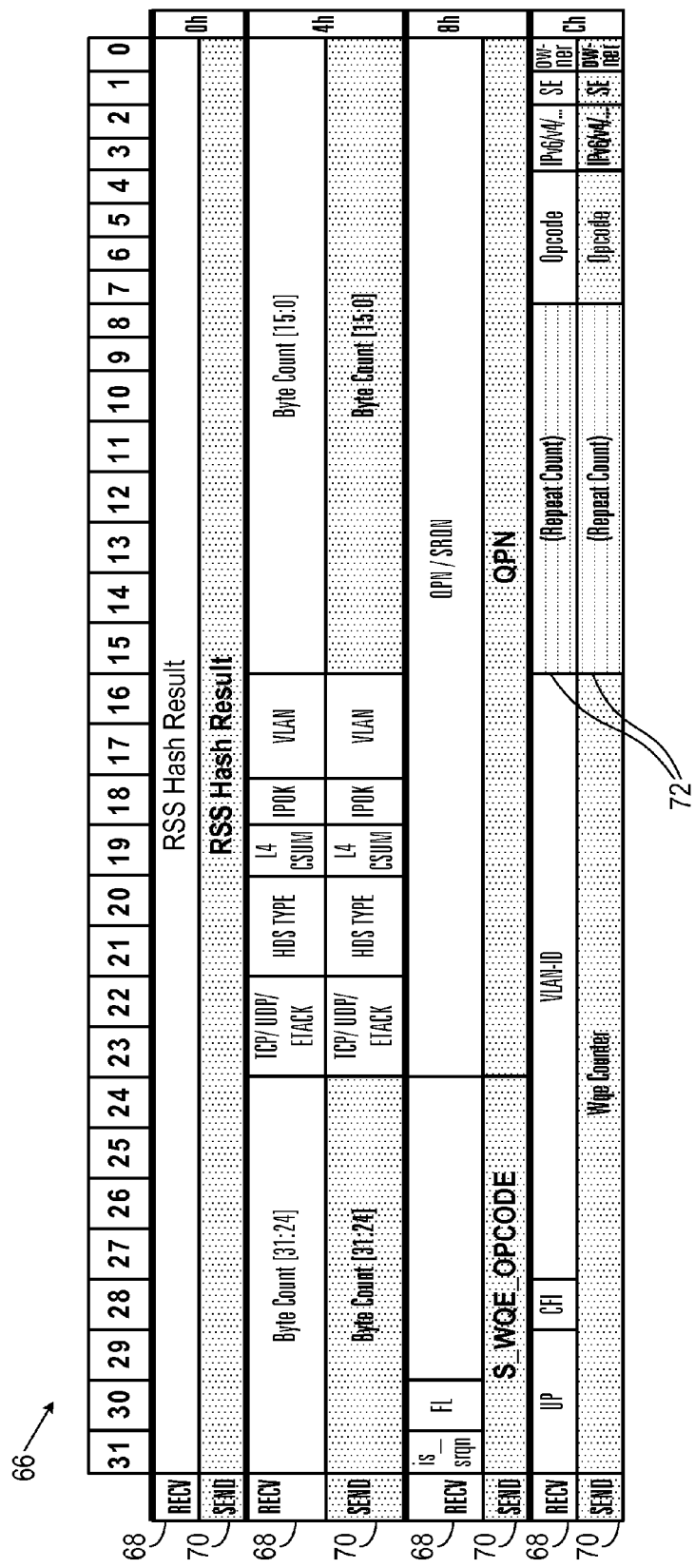
FIG. 3 is a table that schematically illustrates CQE data structures, in accordance with an embodiment of the present invention.

FIG. 3 is a table that schematically illustrates data structures of reduced CQE 66, in accordance with an embodiment of the present invention. The data fields in this figure are, for the most part, selected from the larger set of fields that are listed above in Table I for reporting completion of Ethernet packet operations. Two formats are shown in FIG. 3: Rows 68 contain the fields of the reduced CQE that is used in reporting reception of packets by NIC 38 from network 30, while rows 70 contain the fields used in reporting that packets have been sent. As illustrated in this figure, the 64-byte format of the full CQE can be reduced to only 16 bytes by judicious choice of the fields to be included.

The choice of fields to include or exclude is a design decision, which may vary from system to system and from protocol to protocol. Thus, for example, the CQE fields for reporting completion of message transmission and reception over an InfiniBand network will differ from those shown in the present Ethernet example. The present invention is in no way limited to a particular protocol or CQE-reduction scheme, and those skilled in the art will be able to devise various alternative schemes after reading the present disclosure. All such alternative schemes are considered to be within the scope of the present invention.

Optionally, the data volume of CQE information generated by NIC 38 on a given CQ 56 may be reduced still farther by combining successive CQEs into a single, merged CQE, to report completion of multiple, successive WQEs that have been submitted by one of clients 46. For a CQ that is configured for merging of CQEs, processing circuitry 44 compares each new CQE that it generates to the previous CQE that it stored for this CQ in CQE cache 58. Certain fields, which are expected to change from one CQE to the next (such as the WQE counter shown in FIG. 3, or a signature field), are typically masked out of this comparison. If the non-masked fields of the new CQE are identical to those of the cached CQE, circuitry 44 overwrites the cached CQE with the new CQE. The processing circuitry may also increment the value of a repeat counter 72 in the new CQE to indicate how many successive CQEs this merged CQE actually represents.

When the non-masked fields of the new CQE do not all match the cached CQE, NIC 38 writes the cached CQE (which may itself be a merger of previous CQEs) to the appropriate CQ 56 in memory 34 and writes the new CQE to cache 58. Furthermore, NIC 38 may maintain a timer for each line of CQE cache 58 (wherein each line corresponds to a different CQ) and may transmit the contents of the line when the timer elapses, without waiting for the next, new CQE. In either case, when client 46 reads the merged CQE from CQ 56, it uses the value of repeat counter 72 to determine how many successive WQEs have been executed according to the merged CQE.

Although the use of merged CQEs is described above with particular reference to the reduced CQE format of FIG. 3, CQEs of substantially any type and format may be merged in this fashion. Such a merger of CQEs is advantageous in reducing the data volume consumed in memory 34 and the bandwidth used on bus 36. Thus, for example, successive incremental CQEs 62 may be merged, as may full 64-byte CQEs, subject to proper choice of the fields to be masked when comparing successive CQEs.

In latency-sensitive applications, the mechanisms described above for combined transmission of multiple CQEs (by coalescing, compression and/or merger), as well as the use of a timer to delay WQE transmission, can have a deleterious effect on application performance. To avoid this sort of performance penalty, NIC 38 may be configured to combine CQEs only when necessitated by system conditions, such as when bus 36 is congested. For example, if bus 36 comprises a PCIe bus, the NIC can detect bus congestion by monitoring flow control credits on the bus, and can send all CQEs immediately when the bus is uncongested or combine CQEs and thus conserve bus bandwidth when congestion is detected. Similarly, even when mechanisms of combined transmission of CQEs are in use, NIC 38 may flush cache 58 whenever congestion is low.

Additionally or alternatively, as described below, NIC 38 may transmit the first CQE (or CQEs) in a given cache line immediately, and combine subsequent CQEs in the same line.

Figure 4:
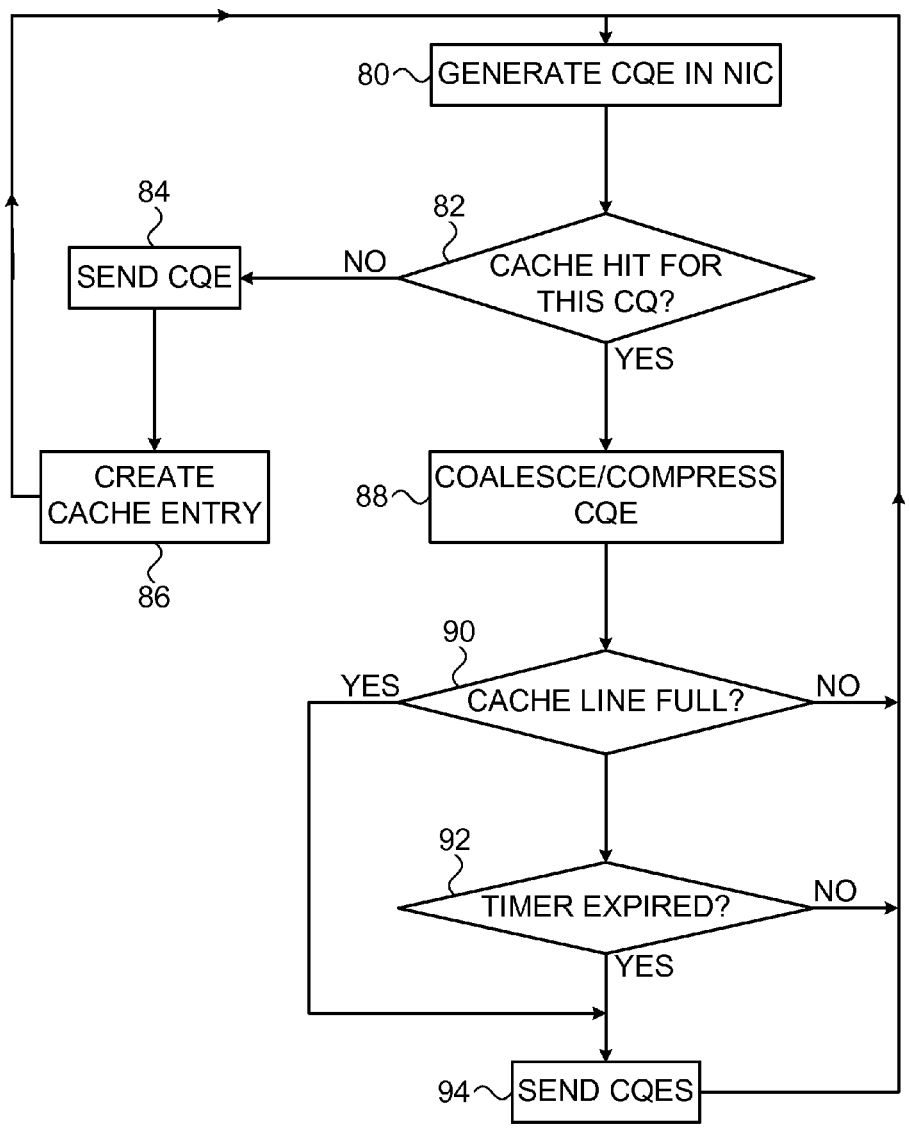
FIG. 4 is a flow chart that schematically illustrates a method for generation and delivery of CQEs, in accordance with an embodiment of the present invention.

FIG. 4 is a flow chart that schematically illustrates a method by which NIC 38 generates and delivers CQEs to memory 34, in accordance with an embodiment of the present invention. This method assumes that processing circuitry 44 saves CQEs in cache 58 and then transmits coalesced CQEs 64 or compressed CQEs 68, as shown in FIG. 2B or 2D.

Upon completing execution of a WQE from send queue 52 or receive queue 54, processing circuitry 44 generates corresponding completion data for incorporation in a CQE, at a CQE generation step 80. Circuitry 44 checks the CQ number of the CQE against cache 58 to determine whether the cache contains a line for this CQ, at a cache checking step 82. (Typically, the tags of the cache lines correspond to CQ numbers, while the length of each line corresponds to the maximum volume of CQE data that is to be transmitted from NIC 38 to memory 34 in a single burst, such as 128 bytes.)

In the case of a cache miss, it may be assumed that NIC 38 has not transmitted any CQE on this CQ for a long time. In this case, to avoid causing a bottleneck in execution of the corresponding client 46, NIC 38 writes the CQE to memory 34 immediately, at a single-CQE transmission step 84. Processing circuitry 44 also creates an entry in cache 58, at a cache line initiation step 86, to reserve a cache line for this CQ number and thus to create a cache record to be used in handling the next CQE for this CQ. When the cache is full, circuitry 44 may overwrite a cache line that was previously assigned to another CQ, typically a least-recently-used basis as is known in the art. NIC 38 then returns to step 80 to generate the next CQE.

When there is a cache hit at step 82, processing circuitry 44 adds the current CQE to the appropriate cache line, at a cache writing step 88. If this CQ is configured to receive reduced CQEs 66, circuitry 44 simply writes each successive CQE, in reduced form, to the appropriate cache line until the line is full. If the CQ is configured for incremental CQEs 62 and a header CQE 60 already exists in the corresponding cache line, circuitry 44 compares the current CQE to the header CQE and, assuming the required field values match, writes the appropriate incremental CQE to the cache line at step 88. Otherwise, circuitry 44 writes a new header CQE to the cache line based on the current CQE.

After writing CQE data to a cache line, processing circuitry 44 checks whether the cache line is full, at a cache data checking step 90. If so, NIC 38 writes the contents of the cache line as a compressed or coalesced CQE (as appropriate) to the proper CQ 56 in memory 34, at a combined-CQE transmission step 94. To avoid excessive latency in reporting completions to clients 46, the NIC may also maintain a timer for each line in cache 58. Upon expiration of the timer, at a timer checking step 92, the NIC may write the contents of the corresponding cache line to memory 34 at step 94 even if the cache line is not yet full.

In either case, after writing the compressed or coalesced CQE to memory 34, NIC 38 returns to step 80 to generate the next CQE in the sequence.

Although the above embodiments relate specifically to the operation of NIC 38 in reporting completion of packet transmission and reception operations over network 30 (and even more particularly to performance of these functions in relation to an Ethernet network), the principles of the present invention are similarly applicable, mutatis mutandis, to NICs and networks of other types, as well as to other sorts of I/O devices and peripheral devices generally. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer peripheral device, comprising:
   a host interface, which is configured to communicate over a bus with a host processor and with a system memory of the host processor;
   a cache; and
   processing circuitry, which is configured to receive and execute work items submitted to the peripheral device by client processes running on the host processor, and responsively to completing execution of the work items, to generate completion reports and to write a plurality of the completion reports to the system memory via the bus together in a single bus transaction, wherein the processing circuitry is configured to write the completion reports to respective completion queues in the system memory, to associate each line of the cache with a respective completion queue, to save the completion reports in the lines of the cache, and then to write the plurality of the completion reports from each of at least some of the lines in the cache to the respective completion queue in the system memory.

2. The device according to claim 1, wherein each of the completion reports in the plurality has a data size that is less than a minimum transaction size of the bus.

3. The device according to claim 1, wherein the processing circuitry is configured, upon generating a completion report for a given completion queue for which there is no associated line in the cache, to write the generated completion report immediately to the system memory and to associate one of the lines of the cache with the given completion queue.

4. The device according to claim 1, wherein the processing circuitry is configured to detect congestion on the bus, and to write the plurality of the completion reports via the bus together responsively to detecting the congestion, and to write the completion reports via the bus to the system memory individually when the bus is not congested.

5. The device according to claim 1, wherein at least one of the completion reports comprises a merged completion report, which is generated by the processing circuitry to report completion of multiple, successive work items submitted by one of the client processes.

6. The device according to claim 1, and comprising a network interface, which is configured to transmit and receive data packets to and from a network, and wherein each completion report indicates that one or more data packets have been transmitted or received in accordance with a corresponding work item.

7. A computer peripheral device, comprising:
a host interface, which is configured to communicate over a bus with a host processor and with a system memory of the host processor; and
processing circuitry, which is configured to receive and execute work items submitted to the peripheral device by client processes running on the host processor, and responsively to completing execution of the work items, to write completion reports to the system memory, including at least one merged completion report that reports completion of multiple work items in a succession of the work items submitted by one of the client processes,
wherein the processing circuitry is configured to insert in the merged completion report a value of a repeat counter, indicating a number of the multiple work items whose completion is reported by the merged completion report.

8. The device according to claim 7, wherein each completion report comprises multiple data fields having respective values, and wherein the processing circuitry is configured to write the completion reports to respective completion queues in the system memory, to compare the respective values of the data fields in at least first and second completion reports that are directed to a given completion queue, and to merge the first and second completion reports into a merged completion report upon finding that the respective values of a predefined set of the data fields in the first and second completion reports are identical.

9. The device according to claim 7, wherein the processing circuitry is configured to detect congestion on the bus and to merge the completion reports responsively to detecting the congestion, and to write the completion reports via the bus to the system memory individually, without merging the completion reports, when the bus is not congested.

10. The device according to claim 7, and comprising a network interface, which is configured to transmit and receive data packets to and from a network, and wherein each completion report indicates that one or more data packets have been transmitted or received in accordance with a corresponding work item.

11. A method for reporting, comprising:
receiving and executing, in a peripheral device, work items submitted to the peripheral device by client processes running on a host processor having a system memory and a bus connecting the peripheral device to the system memory;
generating completion reports in the peripheral device responsively to completing execution of the work items;
detecting congestion on the bus;
writing the completion reports via the bus to the system memory individually when the bus is not congested; and
responsively to detecting the congestion, writing a plurality of the completion reports to the system memory via the bus together in a single bus transaction.

12. The method according to claim 11, wherein each of the completion reports in the plurality has a data size that is less than a minimum transaction size of the bus.

13. The method according to claim 11, wherein generating the completion reports comprises associating lines of a cache in the peripheral device with respective completion queues in the system memory, and saving the completion reports in the lines of the cache, and
wherein writing the plurality of the completion reports comprises writing the plurality of the completion reports together from each of at least some of the lines in the cache to the respective completion queue in the system memory.

14. The method according to claim 13, and comprising, upon generating a completion report for a given completion queue for which there is no associated line in the cache, writing the generated completion report immediately to the system memory and associating one of the lines of the cache with the given completion queue.

15. The method according to claim 11, wherein generating the completion reports comprises generating a merged completion report to report completion of multiple, successive work items submitted by one of the client processes.

16. The method according to claim 11, wherein executing the work items comprises transmitting and receiving data packets between the peripheral device a network, and wherein each completion report indicates that one or more data packets have been transmitted or received in accordance with a corresponding work item.

17. A method for reporting, comprising:
receiving and executing, in a peripheral device, work items submitted to the peripheral device by client processes running on a host processor having a system memory; and
responsively to completing execution of the work items, writing completion reports from the peripheral device to the system memory, including at least one merged completion report that reports completion of multiple work items in a succession of the work items submitted by one of the client processes,
wherein each completion report comprises multiple data fields having respective values, and wherein writing the completion reports comprises:
comparing the respective values of the data fields in at least first and second completion reports that are to be directed by the peripheral device to a given completion queue in the system memory;

merging the first and second completion reports into a merged completion report upon finding that the respective values of a predefined set of the data fields in the first and second completion reports are identical.

18. The method according to claim 17, wherein merging the first and second completion reports comprises inserting in the merged completion report a value of a repeat counter, indicating a number of the multiple work items whose completion is reported by the merged completion report.

19. The method according to claim 17, and comprising detecting congestion on a bus connecting the peripheral device to the system memory, wherein writing the completion reports comprises merging the completion reports responsively to detecting the congestion, and writing the completion reports via the bus to the system memory individually, without merging the completion reports, when the bus is not congested.

20. The method according to claim 17, wherein executing the work items comprises transmitting and receiving data packets between the peripheral device a network, and wherein each completion report indicates that one or more data packets have been transmitted or received in accordance with a corresponding work item.

\* \* \* \* \*